Oct. 26, 1926.
C. H. VOGEL
FENDER
Filed Feb. 24, 1926
1,604,861
2 Sheets-Sheet 1
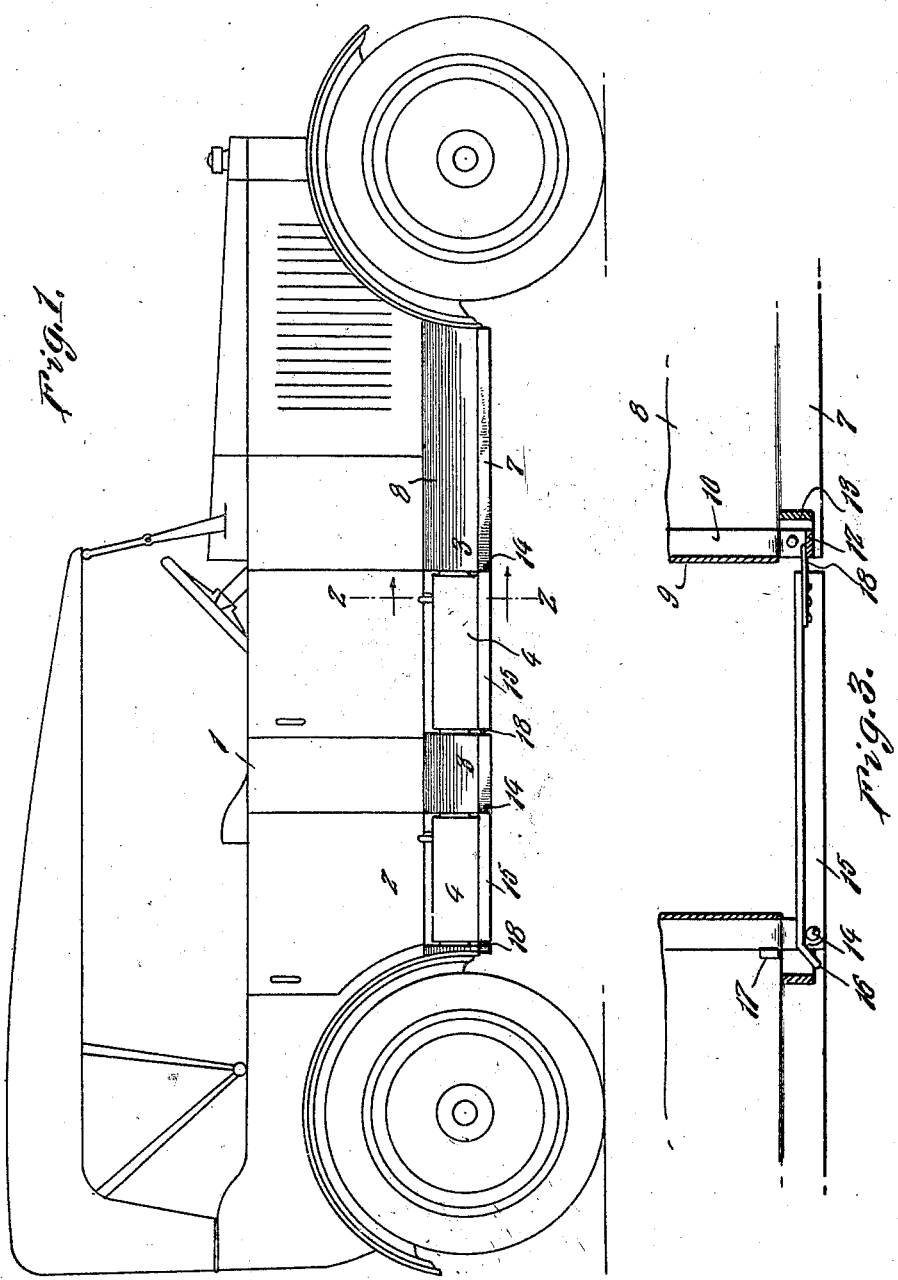

Oct. 26, 1926.
C. H. VOGEL
FENDER
Filed Feb. 24, 1926
1,604,861
2 Sheets-Sheet 2
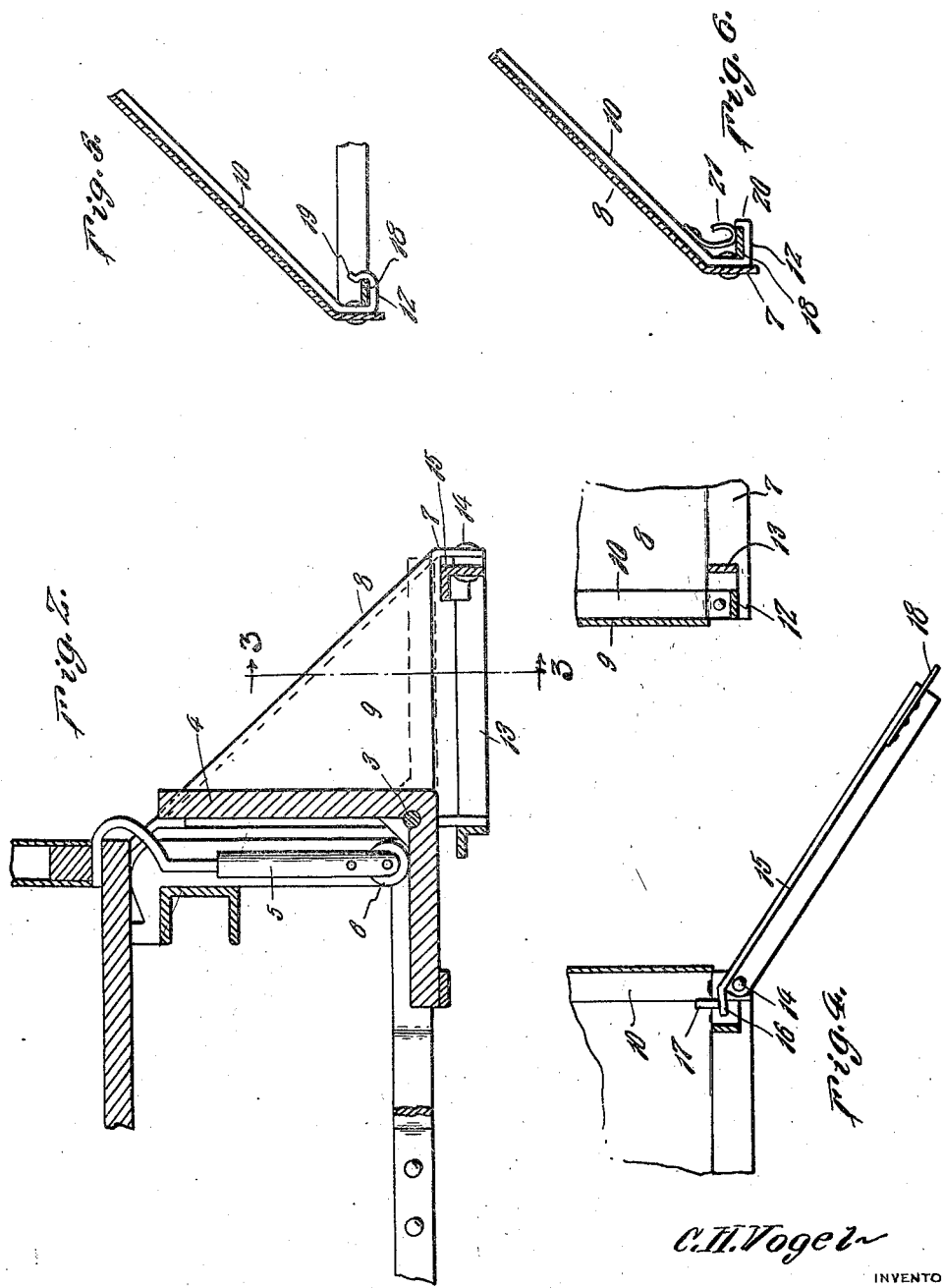
C. H. Vogel
INVENTOR
BY Victor J. Evans
ATTORNEY Patented Oct. 26, 1926.

1,604,861

UNITED STATES PATENT OFFICE.

CARL HENRY VOGEL, OF BUFFALO, NEW YORK.

FENDER.

Application filed February 24, 1926. Serial No. 90,381.

My present invention has reference to a fender designed to take the place of the running board of an automobile, and adapted for use in connection with the disappearing step upon which U. S. Letters Patent No. 1,542,113, was granted me on June 16, 1925. My object is the provision of a fender which shall be arranged at an angle on the sides of the car so that thieves or unlawful persons cannot successfully rest thereon, the said fender being made up of sections, the spaces between the sections being arranged opposite the disappearing steps, and these spaces are partly filled or bridged with yieldable gates which serve as protector devices for the spaces between the fender sections, but which are swung at a downward angle but not in ground contacting engagement when pressure is exerted thereagainst.

To the attainment of the above broadly stated objects and others which appear as the nature of the invention is better understood, the improvement further resides in certain novel features of construction, combination and operative association of parts, a satisfactory embodiment of which is disclosed by the accompanying drawings.

In the drawings:

Figure 1 is a side elevation of an automobile equipped with the improvement.

Figure 2 is a sectional view on the line 2—2 of Figure 1.

Figure 3 is a detail horizontal sectional view approximately on the line 3—3 of Figure 2 looking in the direction of the arrow.

Figure 4 is a sectional view substantially similar to Figure 3, looking in the same direction but showing one of the yieldable gates swung downardly as when pressure has been exerted thereagainst.

Figures 5 and 6 are detail sectional views through the fenders illustrating different manners of holding the free ends of the yieldable gates thereon.

In Figure 1 of the drawings, an automobile of the usual construction is broadly indicated by the numeral 1. The doors of the automobile are indicated by the numeral 2 and pivoted, as at 3, below each door 2, there is the angle member that constitutes the disappearing step 4 which forms the subject matter of my mentioned Patent No. 1,542,113. Each door is provided with depending means 5, each including a roller 6 that contacts with the angle portions of the disappearing steps to swing the step to operative or inoperative positions, as the door is swung open or closed. This construction forms the subject matter of my mentioned patent and therefore a further detailed description will not be entered into. Between and at the sides of the disappearing steps the body of the automobile 1 is equipped with fender sections that form important elements of my present application. The fender sections are each of a similar construction and are preferably of metal. Each fender section includes a straight lower or base portion 7 and an angle body portion 8. Suitable means are provided for securing the straight and the upper edge of the angle portions of the fenders to the automobile body. The ends of the fenders are closed, as at 9, and reinforcing plates 10 are arranged in the fenders at the said closed ends thereof. These plates have their lower ends formed with angle extensions 12 which are connected to the straight portions 7 of the fenders, and inward of the said portions 12 lateral brace members 13 are provided for the fenders. Pivotally secured, as at 14, to one of the fender sections, at the end thereof in a line with one of the edges of the doors 2, there is an angle plate 15 that provides a gate for bridging the spaces between the fender sections. The pivoted end of the gate 15 has a tail portion 16, designed to contact with a lug 17 on one of the fender sections. The second or free end of each gate is provided with a flat spring extension 18 designed to be sprung into engagement with the flange 12 of the brace member 11 of the adjacent fender section.

The gate members 15 are disposed between the fender sections at the outer edges thereof, and consequently bridge the gap between said fender sections. The inclined fender sections will effectively prevent robbers or other unlawful persons from obtaining a foot hold on the sides of the car, and while the gates are primarily intended to prevent injury to persons who might accidentally place themselves in the gap or space between the fender sections, it will be apparent that a downward pressure thereon will swing the said gate to the position illustrated in Figure 4 of the drawings. By virtue of the tail 16 contacting with the stop 17 the gate is prevented from contacting with the ground surface so that no injury will be inflicted to the gate when the car is propelled. Thus it will be noted that any attempt to board the car at the spaces between the fenders will also be effectively prevented.

In Figure 5 of the drawings I have illustrated the angle portion 12 of one of the brace members 10' formed on its edge with an upstanding curved spring lip 19 to engage with the flat spring 18 of the gate member, while in Figure 6 I have illustrated the said angle end 12 of the brace member 10 formed at its ends with a straight upstanding lip 20, and the brace member 10 has attached thereto one arm of a substantially C-shaped spring 21, the said spring designed to overlie the spring or tongue 18 on the gate.

It is, of course, to be understood that the gate is not removed when the step is in open or active position, as while the said step fully fills the space between the fenders it overlies but does not contact with the gate.

The simplicity of my construction and the advantages thereof will, it is thought, be perfectly apparent to those skilled in the art to which the invention relates, when the foregoing description has been carefully read in connection with the accompanying drawings.

It is, of course, to be understood that I do not wish to be limited to the precise details of construction herein set forth and hold myself entitled to make such changes therefrom as fairly fall within the scope of what I claim.

Having described the invention, I claim:—

1. An automobile or like vehicle having foldable steps below the doorways thereof, operated by the opening and closing of the doors, angle fenders between and at the opposite sides of the foldable steps, and a yieldable gate bridging the spaces between the fenders.

2. An automobile or like vehicle having foldable steps below the doorways thereof, operated by the opening and closing of the doors, angle fenders between and at the opposite sides of the foldable steps, and a pivotally supported yieldable gate bridging the spaces between the fender sections.

3. An automobile or like vehicle having foldable steps below the doorways thereof, operated by the opening and closing of the doors, angle fenders between and at the opposite sides of the foldable steps, a pivotally supported yieldable gate bridging the spaces between the fender sections, means normally sustaining the gate in closed position and means for limiting the swinging of the gate when in open position.

4. An automobile or the like having foldable steps below the doorway thereof operated by the opening and closing of the doors, angle fenders between and at the opposite sides of the foldable steps, yieldable gates bridging the spaces between the fenders and arranged below and out of contacting engagement with the foldable step when the latter is swung to operative position.

In testimony whereof I affix my signature.

CARL HENRY VOGEL.